United States Patent [19]

Arnason et al.

[11] Patent Number: 4,725,627

[45] Date of Patent: Feb. 16, 1988

[54] SQUEEZABLE TOY WITH DIMENSIONAL MEMORY

[75] Inventors: Sigurdur I. Arnason, Worthington; Michael A. Kunke, Dublin, both of Ohio

[73] Assignee: Signastone Incorporated, Dublin, Ohio

[21] Appl. No.: 25,849

[22] Filed: Mar. 16, 1987

[51] Int. Cl.$^4$ .............................................. C08G 18/30
[52] U.S. Cl. ........................................ 521/65; 521/67; 521/69; 521/113; 521/114; 521/116; 521/159; 521/137; 521/905; 446/486
[58] Field of Search ...................... 521/65, 67, 69, 116, 521/113, 114, 137, 905, 159; 446/486

[56] References Cited

U.S. PATENT DOCUMENTS 4,158,087  6/1979  Wood .................................. 521/137

*Primary Examiner*—Maurice J. Welsh
*Assistant Examiner*—S. A. Acquah
*Attorney, Agent, or Firm*—Mueller and Smith

[57] ABSTRACT

Disclosed is a sculpted, hand-squeezable toy which possesses dimensional memory and has a predetermined dimensional memory restoration time. The toy is made by blending a foamable hydrophilic polyurethane isocyanate-functional prepolymer, a vinyl or acylic polymer emulsion recovery rate modifier, water, and an organic cosolvent. The blend then is charged to a mold for the foamed toy to be made therein. The proportion of organic cosolvent present and the temperature of the blend being molded are variables for determining the predetermined dimensional memory restoration time of the toy after it has been squeezed.

6 Claims, No Drawings

SQUEEZABLE TOY WITH DIMENSIONAL MEMORY

BACKGROUND OF THE INVENTION

The present invention is directed to a hand squeezable toy and more particularly to one of unique dimensional memory properties.

The molding of toy figures from foamable polyurethane and other polymers is known. The resulting toy figures can range from doll-like figures to the most bizarre imaginary space creatures. Additives, colorants, perfumants, and mold shapes add distinctive touches and features to the various figures. For example, some of the toy figures feel very slimy while others are very hard and impact-resistant.

Of course, some of the formulations have utility outside the toy field. For example, foamaceous polyurethane ear plugs, nose plugs, and the like have been developed for swimmers for example. A variety of other useful products are made from foamable urethane and like polymers. Still, most of these toy and other products are made to retain their original dimensional shape. That is, when the products are compressed, they readily spring back to their original configuration. While such memory retention function is necessary for most useful articles, the same may not be true when toy and novelty items are involved. For example, certain toy products have been developed which possess an unusual modulus of elasticity which permits them to be stretched and then returned to their original configuration readily.

Addressing ear plugs and like articles, low resiliency urethane foams have been proposed in U.S. Pat. No. 4,158,087. These foams are made from a polyoxyalkylene urethane prepolymer, water, and a synthetic polymer latex. An increase in the synthetic polymer latex results in a lowering of the resiliency of the foam. The present invention improves upon such urethane foams for toy and novelty items.

BROAD STATEMENT OF THE INVENTION

The present invention is directed to a sculpted, hand-squeezable toy which possesses dimensional memory and a predetermined dimensional memory restoration time. The hand-squeezable toy is made by blending a foamable hydrophilic polyurethane isocyanate-functional prepolymer with a vinyl or acrylic polymer emulsion recovery rate modifier, water, and an organic co-solvent. The blend then is added to a mold or form, optionally of predetermined configuration, and the foamed toy made therein. The proportion of recovery rate modifier, said optional solvent, and the temperature of the blend being molded are varied for determining the predetermined dimensional memory restoration time of the toy after it has been hand squeezed.

Advantages of the present invention include the identification and selection of processing variables which enable the manufacturer to control the dimensional memory restoration time of the toy. Another advantage is a truly remarkable toy product which will stimulate imagination in response to a psychological need. These and other advantages will be readily apparent to those skilled in the art based upon the disclosure contained herein.

DETAILED DESCRIPTION OF THE INVENTION

The hand squeezable toy product of the present invention can be squeezed, deflected, or otherwise contorted to change its features, yet the dimensional memory of the product enables a predetermined restoration time (e.g. about 1–4 minutes) to be configured for the product so that it will slowly, yet predictably, recover to its original dimension. This action can occur repeatedly with the toy product always returning to the same initial dimension. The toy product or sculpted object may take the form of an individual (imaginary or real), an animal, an inanimate object, a cartoon character, or the like. The object can be manipulated with the hand or another object (e.g. pencil, table, or the like) to change the expression to a smile, a frown, or the like; to indicate a change of age of the object; to change one object to another (e.g. a pig to a rabbit by pushing in the nose, flattening and turning of the ears); or the like. Once picked up, the toy products of the present invention tend to be infectious in that individuals tend to continue playing with the object for extended periods of time.

Two prime ingredients are used in the formulation of the toy products of the present invention. The primary ingredient is the foamable continuous phase which desirably is a foamable hydrophilic polyurethane prepolymer. Suitable such foamable hydrophilic prepolymers are set forth in U.S. Pat. No. 4,158,087, and comprise foamable hydrophilic polyether polyurethane polyisocyanate polymers such as HYPOL FHP 2000, 3000, or other grade prepolymer (W. R. Grace & Company, Lexington, Mass.) FHP 2000 prepolymer is reported to have a molecular weight of 1400, 2.3 isocyanate groups per mole, 450–520 equivalent weight per NCO group, 1.95–2.20 NCO content, 10,000–15,000 cps at 25° C., 1.19 g/ml at 25° C.

Foaming of the foamable polyurethane prepolymer typically is accomplished by the addition of water or other hydroxyl agent and can be augmented by a variety of conventional surfactants in conventional fashion. The use of water in controlling the dimensional memory restoration time will be discussed in more detail below. Foams made merely from the foamable hydrophilic prepolymer tend to exhibit a restoration or recovery time which is immediate. The controlled, slow recovery of the toy product of the present invention, however, requires the addition of a tackifier or recovery rate modifier.

The modifier often may be referred to as a "tackifier" herein since upon curing, the recovery rate modifier exhibits stickiness or tackiness. It is believed that the cell walls in the toy product are held together by the tackiness of the modifier until the compressive recovery strength of the foamed polyurethane is greater than the adhesive bond between the cell walls due to the presence of such modifier. Such modifiers also are set forth in U.S. Pat. No. 4,158,087, and can be described as acrylic or vinyl polymer emulsions with the preferred such modifier comprising UCAR 874 latex which is reported to be a 60 wt-% emulsion of a soft, self-crosslinking acrylic latex, specific gravity 1.08 at 20° C., 4.5 pH at 25° C., 400 CP (Brookfield Model LVT, spindle no. 2, 60 rpm), 9.0 lb/gal at 20° C. An equivalent thereof by a different manufacturer is DAREX 2424-113 acrylic latex manufactured by W. R. Grace and Company. Yet another suitable vinyl emulsion is National 40-0857 vinyl emulsion manufactured by National Starch Corporation. Each of these vinyl emulsions exhibit tackiness when cured.

It is known that the restoration time and recovery rate are influenced by the proportion of vinyl emulsion modifier incorporated into the formulation. Increasing the proportion of modifier increases restoration time and reduces the recovery rate. With the preferred FHP 2000 hydrophilic prepolymer and UCAR 874 modifier, broad ranges have been found to be from about 1:1 to 1:3, respectively. Also, it has been determined that increasing the amount of water in the formulation also has the effect of increasing the restoration time and reducing the recovery rate.

Unexpectedly, this same influence also is exhibited by lowering the temperature of the blend admitted to the mold. Finally, the addition of organic cosolvent has the reverse affect in that increases of organic cosolvent tend to diminish the dimensional memory restoration time and increase the recovery rate. Handling and processing of the blend also is facilitated by the presence of organic cosolvents. Suitable combinations of these factors will be employed depending upon the restoration time desired, cost and availability of raw materials, size of the toy product being molded, and like factors.

It should be understood that the restoration time is influenced by the compressive force exerted on the toy product, the duration of the compressive force exerted, the bulk volume of the product at the position of force exertion, and the like. The foregoing restoration time factors are determined by assuming a standard density for the toy product (e.g. about 0.27 g/cc) and then exerting the same force in the same manner on identically-configured comparative toy products. Under such a controlled environment, the various factors can be tested with respect to their influence on the restoration time and rate of recovery of the toy product. Further, it will be appreciated that other conventional form factors also will influence the restoration time, e.g. cell configuration (i.e. open or closed cell and shape of the cell), aging of the product, skin texture, rate at which the product is dried, foam rise direction, and like factors in the foamed article art.

As noted above, organic cosolvents have a specific effect on the restoration time. Such organic cosolvents preferably are provided along with the foamable hydrophilic polyurethane portion of the blend and include a variety of alcohols (e.g. isopropanol), glycols (e.g. ethylene glycol), glycol ethers (e.g. ethylene glycol monobutyl ether), esters (e.g. ethylene glycol monobutyl ether acetate), ketones (e.g. acetone or methyl ethyl ketone), and the like with acetone and ethylene glycol monobutyl ether being preferred.

The water portion of the blend preferably is provided along with the vinyl polymer emulsion modifier. A variety of dyes, pigments, odorants, surfactants, and like optional ingredients can be included in the blend being molded in conventional fashion. Surfactants, for example, can be used to adjust hydrophilicity, cell size and type, and other factors of the foam as is well known in the polyurethane foam field.

The molding or forming process desirably employs a vulcanized silicon mold or mold coating in order to facilitate article release. The mold surface also may be coated with a soap solution to improve wetting and decrease air entrapment. Also, the mold may be further coated with colorants or flocking, or provision for object insertion (eye insertion in a mold face) may be provided in conventional fashion. Flexible molds also may be utilized to advantage in the process to achieve special effects. For example, the blend can be poured into a container filled with fumed silica or the like to create exceptionally unique, molded toy products. If desired, the blend even can be poured into a dish or on a tray to make a toy product. Thus, the term "mold" or "form" is to be construed broadly for present purposes.

The foamable polyurethane prepolymer and vinyl polymer emulsion modifier are mixed to a homogeneous composition in a static mixer, rotary gear pump or the like, and charged into the mold. Initially, the volume increases due to gas formation. The rate of foaming can be controlled by controlling the temperature of the reactants which, as noted above, has a definite influence on the restoration time of the resulting molded toy product. The skin texture of the toy product can be controlled by controlling the mold temperature wherein lower mold temperatures tend to create a denser (i.e. less foamed) outer surface of the product. Next, the material in the mold develops green strength or set which is initial cross-linking of the material. As soon as sufficient cross-linking has occurred, the toy product can be demolded. After demolding further decoration may be performed on the toy product and volatiles removed at an accelerated rate by subjecting the toy product to microwave energy, infra-red or conduction/convection heating, or the like.

The following examples show how the invention can be practiced, but should not be construed as limiting. All percentages and proportions are by weight, unless otherwise expressly indicated. Also, all citations referred to herein are expressly incorporated herein by reference.

EXAMPLES

EXAMPLE 1

Three standard formulations were compounded for evaluation. In all of the examples, the blends were poured into a cup (nominal 12 oz. capacity) until they were set. Each sample then was dried at the same relative humidity until each sample mesured (three times) the same desired weight. Thereafter, all of the comparative samples in the examples were compressed between the same two boards and the time for the samples to recover to their original height recorded.

TABLE 1

| Ingredient* | Run 1 | Run 2 | Run 3 |
| --- | --- | --- | --- |
| Side "B" | | | |
| UCAR 874 | 38 | 38 | 10 |
| Tap Water | 12 | 12 | 40 |
| Side "A" | | | |
| Hypol FHP 2000 | 20 | 20 | 25 |
| Butyl Cellosolve | — | 5 | — |
| Acetone | — | — | 3 |
| Molding Temp. | Room | Room | Room |
| Recovery Rate(sec.) | 413 | 122 | 115 |

*Ingredients defined above in specification. All values are weight parts.

The above-tabulated results demonstrate the impact which small amounts of cosolvent have on the recovery rate and restoration times of the blend compared to the comparative sample of Run 1. This demonstrates the ability to predetermine the recovery time of the product.

EXAMPLE 2

In this example, the proportion of UCAR 874 latex modifier was varied in order to adjudge the effect on the recovery rate of the cosolvent blend of Run 2 of Example 1.

TABLE 2

| Ingredient | Run 4 | Run 5 | Run 2 | Run 6 | Run 7 |
|---|---|---|---|---|---|
| Side "B" | | | | | |
| UCAR 874 | 30 | 34 | 38 | 42 | 46 |
| Tap Water | 16 | 14 | 12 | 10 | 8 |
| Side "A" | | | | | |
| Hypol FHP 2000 | 20 | 20 | 20 | 20 | 20 |
| Butyl Cellosolve | 5 | 5 | 5 | 5 | 5 |
| Molding Temp. | Room | Room | Room | Room | Room |
| Recovery Rate(sec.) | 37 | 77 | 122 | 172 | 218 |

These results demonstrate the effect which the latex modifier has on recovery rates. Increasing the latex modifier increased the recovery time (decreased the rate of recovery). Interestingly, it will be observed that a nearly linear relationship between recovery rate and proportion of modifier exists.

EXAMPLE 3

In this example, the proportion of water was varied in order to adjudge the effect on the recovery rate of the cosolvent blend of Run 2 of Example 1.

TABLE 3

| Ingredient | Run 8 | Run 9 | Run 2 | Run 10 | Run 11 |
|---|---|---|---|---|---|
| Side "B" | | | | | |
| UCAR 874 | 38 | 38 | 38 | 38 | 38 |
| Tap water | 10 | 11 | 12 | 13 | 14 |
| Side "A" | | | | | |
| Hypol FHP 2000 | 20 | 20 | 20 | 20 | 20 |
| Butyl Cellosolve | 5 | 5 | 5 | 5 | 5 |
| Molding Temp. | Room | Room | Room | Room | Room |
| Recovery Rate(sec.) | 250 | 270 | 122 | 300 | 340 |

These results demonstrate that small changes in the amount of water can have a significant affect on the recovery rate of the product. This means that processing conditions should be monitored closely for maximizing recovery rate predictability.

EXAMPLE 4

In this example, the proportion of butyl cellosolve cosolvent was varied in order to determine the effect on the recovery rate of the blend of Run 2 of Example 1.

TABLE 4

| Ingredient | Run 12 | Run 13 | Run 2 | Run 14 | Run 15 |
|---|---|---|---|---|---|
| Side "B" | | | | | |
| UCAR 874 | 38 | 38 | 38 | 38 | 38 |
| Tap water | 12 | 12 | 12 | 12 | 12 |
| Side "A" | | | | | |
| Hypol FHP 2000 | 20 | 20 | 20 | 20 | 20 |
| Butyl Cellosolve | 3 | 4 | 5 | 6 | 7 |
| Molding Temp. | Room | Room | Room | Room | Room |
| Recovery Rate(sec.) | 313 | 230 | 122 | 13 | 8 |

These results demonstrate that small quantities of butyl cellosolve cosolvent have a great impact on the recovery rate of the blend. Again, flexibility in design of predetermined recovery rates is demonstrated.

EXAMPLE 5

In this example, the molding temperature of the cosolvent blend of Run 2 of Example 1 was varied with the following results being recorded.

TABLE 5

| Ingredient | Run 2 | Run 16 |
|---|---|---|
| Side "B" | | |
| UCAR 874 | 38 | 38 |
| Tap water | 12 | 12 |
| Side "A" | | |
| Hypol FHP 2000 | 20 | 20 |
| Butyl Cellosolve | 5 | 5 |
| Molding Temp. | Room | 40° F. |
| Recovery Rate(sec.) | 122 | 420 |

The above-tabulated results show that the molding temperature affects the recovery rate of the product. While this affect is not fully understood, perhaps the nature and/or size of the cells of the product were affected by the molding temperature. Regardless of the explanation, the results are clear.

EXAMPLE 6

In this example, the proportion of UCAR 874 latex modifier was varied in the formulation of the cosolvent blend of Run 3 of Example 1 as follows.

TABLE 6

| Ingredient | Run 17 | Run 18 | Run 19 | Run 3 |
|---|---|---|---|---|
| Side "B" | | | | |
| UCAR 874 | 30 | 25 | 20 | 10 |
| Tap Water | 20 | 25 | 30 | 40 |
| Side "A" | | | | |
| Hypol FHP 2000 | 25 | 25 | 25 | 25 |
| Acetone | 3 | 3 | 3 | 3 |
| Molding Temp. | Room | Room | Room | Room |
| Recovery Rate (sec.) | 360 | 145 | 240 | 115 |

Again, the ability to vary the recovery rate of the product by varying the modifier is demonstrated.

We claim:

1. A method for making a hand squeezable toy product which possesses dimensional memory and a predetermined dimensional memory restoration time following its squeezing, which comprises:
   blending a foamable hydrophilic polyurethane prepolymer with a vinyl or acrylic polymer emulsion modifier, water, and an organic cosolvent;
   adding said blend to a mold to form said toy product; and
   varying one or more of the proportion of said cosolvent or the temperature of said blend added to said mold for determining said predetermined dimensional memory restoration time of said toy after it has been squeezed.

2. The method of claim 1 wherein said polyurethane prepolymer comprises a foamable hydrophilic polyether polyurethane polyisocyanate.

3. The method of claim 2 wherein the ratio of said polyurethane prepolymer to said modifier ranges from between about 1:1 and 1:3.

4. The method of claim 1 wherein said organic cosolvent is an alcohol, a glycol, a glycol ether, an ester, a ketone, or mixtures thereof.

5. The method of claim 4 wherein said organic cosolvent is selected from isopropanol, ethylene glycol, acetone, ethylene glycol monobutyl ether, ethylene glycol monobutyl ether acetate, methyl ethyl ketone, and mixtures thereof.

6. The product of the process of claim 1.

* * * * *